(12) United States Patent
Wu

(10) Patent No.: US 8,700,029 B2
(45) Date of Patent: *Apr. 15, 2014

(54) METHOD OF HANDLING RADIO LINK FAILURE DETECTION IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 343 days.

This patent is subject to a terminal disclaimer.

(21) Appl. No.: 12/690,930

(22) Filed: Jan. 21, 2010

(65) Prior Publication Data

US 2010/0240357 A1 Sep. 23, 2010

Related U.S. Application Data

(60) Provisional application No. 61/162,328, filed on Mar. 22, 2009.

(51) Int. Cl.
*H04W 24/00* (2009.01)

(52) U.S. Cl.
USPC ........ 455/425; 455/423; 455/67.11; 455/574; 455/435.2; 370/331

(58) Field of Classification Search
USPC ........ 455/423–425, 67.11–67.16, 435.2, 574; 370/331
See application file for complete search history.

(56) References Cited

U.S. PATENT DOCUMENTS

| 6,782,274 | B1 | 8/2004 | Park | |
|---|---|---|---|---|
| 7,155,261 | B2* | 12/2006 | Chen | 455/574 |
| 8,155,060 | B2* | 4/2012 | Ranta-Aho et al. | 370/329 |
| 8,295,165 | B2* | 10/2012 | Jung et al. | 370/225 |
| 8,391,906 | B2* | 3/2013 | Flore et al. | 455/515 |
| 8,488,443 | B2* | 7/2013 | Lee et al. | 370/216 |
| 8,542,707 | B2* | 9/2013 | Hou et al. | 370/491 |
| 8,599,771 | B2* | 12/2013 | Gholmieh et al. | 370/329 |
| 2001/0018342 | A1* | 8/2001 | Vialen et al. | 455/423 |
| 2007/0264992 | A1 | 11/2007 | Maenpaa | |
| 2008/0268833 | A1 | 10/2008 | Huang | |
| 2009/0175175 | A1 | 7/2009 | Somasundaram | |
| 2010/0120432 | A1* | 5/2010 | Watfa et al. | 455/436 |
| 2010/0197230 | A1* | 8/2010 | Charles et al. | 455/63.1 |
| 2010/0238799 | A1 | 9/2010 | Sebire | |

(Continued)

FOREIGN PATENT DOCUMENTS

| EP | 1 903 824 A2 | 3/2008 |
|---|---|---|
| WO | 2008087524 A2 | 7/2008 |

OTHER PUBLICATIONS

NEC: "Text Proposal to TS 36.331 about RLF procedure", 3GPP TSG-RAN WG2#59bis, R2-074393, Oct. 8-12, 2007, XP050136962, Shanghai, China.

(Continued)

*Primary Examiner* — Sharad Rampuria
(74) *Attorney, Agent, or Firm* — Winston Hsu; Scott Margo

(57) ABSTRACT

A method of handling radio link failure detection for a communication device of a wireless communication system includes performing radio problem detection for a plurality of targets of interest, and managing at least a timer for detecting radio link failure of the plurality of targets of interest.

48 Claims, 8 Drawing Sheets

(56) References Cited

U.S. PATENT DOCUMENTS

| | | | |
|---|---|---|---|
| 2010/0296389 A1* | 11/2010 | Khandekar et al. | 370/216 |
| 2011/0021154 A1* | 1/2011 | Marinier et al. | 455/67.11 |
| 2011/0053595 A1* | 3/2011 | Snow et al. | 455/436 |
| 2011/0183663 A1* | 7/2011 | Kenehan et al. | 455/423 |
| 2012/0182879 A1* | 7/2012 | Tamura et al. | 370/242 |

OTHER PUBLICATIONS

Office action mailed on Jan. 23, 2012 for the U.S. Appl. No. 12/728,270, filed Mar. 21, 2010, p. 1-12.

Huawei: "RAN2 considerations for coordinated multipoint transmission and reception", 3GPP TSG-RAN WG2 meeting #65bis, R2-092178, Mar. 23-27, 2009, XP050340008, Seoul, Korea.

Nokia: "UE behaviour in RRC Connection Re-establishment scenarios", 3GPP TSG-RAN WG2 Meeting #51, R2-061188, May 8-12, 2006, pp. 1-20 and two pages of appendix, XP002488903, Shanghai, China.

Interdigital: "RLF Procedures for Carrier Aggregation", 3GPP TSG-RAN WG2 Meeting #67, R2-094218, Aug. 24-28, 2009, XP050352487, Shen Zhen, China.

LG Electronics Inc.: "Radio Link Failure considering carrier aggregation", 3GPP TSG-RAN2 Meeting #66bis, R2-093856, Jun. 29-Jul. 3, 2009, XP050352063, Los Angeles, USA.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Dec. 2008, 3GPP TS 36.300 V8.7.0.

3GPP, "3rd Generation Partnership Project; Technical Specification Group Radio Access Network; Evolved Universal Terrestrial Radio Access (E-UTRA) Radio Resource Control (RRC); Protocol specification (Release 8)," Mar. 2009, 3GPP TS 36.331 V8.5.0.

3GPP, "3rd Generation Partnership Project; Technical Specification Group Radio Access Network; Further Advancements for E-UTRA Physical Layer Aspects (Release 9)," Feb. 2009, 3GPP TR 36.814 V0.4.1.

Office action mailed on Apr. 25, 2013 for the U.S. Appl. No. 12/728,270, filed Mar. 21, 2010. p. 1-7.

Huawei, "RLF consideration in DC-HSDPA", 3GPP TSG-RAN WG2 Meeting #64, R2-086693, Prague, Czech Republic, Nov. 10-Nov. 14, 2008.

Office action mailed on Aug. 30, 2013 for the Taiwan application No. 099108321, filing date Mar. 22, 2010, p. 1-14.

Office action mailed on Sep. 4, 2013 for the U.S. Appl. No. 12/728,270, filed Mar. 21, 2010, p. 1-10.

* cited by examiner

METHOD OF HANDLING RADIO LINK FAILURE DETECTION IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/162,328, filed on Mar. 22, 2009 and entitled "Method for Handling Radio Link Failure in Multiple Connections in a Wireless Communications System and Related Communication Device" the contents of which are incorporated herein.

BACKGROUND OF THE INVENTION

1. Field of the Invention

The present invention relates to a method utilized in a wireless communication system and communication device thereof, and more particularly, to a method of handling radio link failure detection in a wireless communication system and related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, so that the system structure becomes simple.

In the LTE system, radio link failure (RLF) between a user equipment (UE) and a UTRAN (Universal Terrestrial Radio Access Network) occurs due to all kinds of signal impairments in a wireless environment, unfavorable signal propagation conditions, or even system malfunctions. Therefore, the UE configured with a component carrier or connected to a cell defines a certain timer for RLF detection. For example, when the UE detects a radio problem on a component carrier or on a cell, a timer will be started for detecting radio link failure of the component carrier or the cell, and when the timer expires, the UE considers that the radio link of the component carrier or the cell have failed. That is, the timer is used for determining whether radio link of the component carrier or the cell is failed when the radio problem occurs.

Toward advanced high-speed wireless communication system, such as transmitting data in a higher peak data rate, LTE-Advanced is standardized by the 3rd Generation Partnership Project (3GPP) as an enhancement of LTE system. LTE-Advanced targets faster switching between power states, improves performance at the cell edge, and includes subjects, such as bandwidth extension, coordinated multi-point transmission/reception (COMP), multiple input multiple output (MIMO), etc.

For bandwidth extension, carrier aggregation is introduced to the LTE-Advanced for extension to wider bandwidth, where two or more component carriers are aggregated, for supporting wider transmission bandwidths e.g. up to 100 MHz and for spectrum aggregation. According to carrier aggregation capability, multiple component carriers are aggregated into overall wider bandwidth, wherein UE can establish multiple links corresponding to the multiple component carriers for simultaneously receiving and/or transmitting on each component carrier.

In addition, COMP is considered for LTE-Advanced as a tool to improve coverage of high data rates, cell edge throughput, and system efficiency, which implies dynamic coordination among multiple geographically separated points. That is, when an UE is in a cell-edge region, it is able to receive signal from multiple cells and transmission of the UE can be received at the multiple cells.

According to structure of the LTE system, each UE is only allowed to connect to a single cell with a single component carrier. When a radio problem is detected on the single component carrier or the single cell, the UE starts a timer for RLF detection only on the single component carrier or the single cell. However, according to structure of the LTE Advanced system, the UE operates with carrier aggregation, COMP or both, and connects to multiple cells with same component carrier or with multiple component carriers. The LTE Advanced system does not clearly specify how the RLF detection is applied for the UE with multiple component carriers or multiple cells. Therefore, usage of timer for the RLF detection in the multiple component carriers or multiple cells is never concerned. Improper timer initiation in multiple component carriers or multiple cells may cause abnormal connection malfunction of the UE.

SUMMARY OF THE INVENTION

Therefore, the present invention provides a method of handling radio link failure detection related to multiple component carriers/cells in a wireless communication system and related communication device, so as to reduce a signaling quantity, maintain connection efficiency, or obtain flexibility of radio link failure management.

The present invention discloses a method of handling radio link failure detection for a communication device of a wireless communication system. The method includes performing radio problem detection for a plurality of targets of interest, and starting a timer for detecting radio link failure of the plurality of targets of interest when radio problems are detected on the plurality of targets of interest.

The present invention further discloses a method of handling radio link failure detection for a communication device of a wireless communication system. The method includes performing radio problem detection for a plurality of targets of interest, and starting a timer for detecting radio link failure of one of the plurality of targets of interest when a radio problem is detected on the target of interest.

The present invention further discloses a method of handling radio link failure detection for a communication device of a wireless communication system. The method includes performing radio problem detection for a plurality of targets of interest, starting a first timer for detecting radio link failure of a first target of interest of the plurality of targets of interest when a radio problem is detected on the first target of interest, and starting a second timer for detecting radio link failure of the rest of the plurality of targets of interest when radio problems are detected on the rest of the plurality of targets of interest.

The present invention further discloses a communication device of accurately handling radio link failure detection for a wireless communication system. The communication device includes a detecting unit for performing radio problem detection for a plurality of targets of interest and generating an indication signal when radio problems are detected on the plurality of targets of interest, and a management unit, coupled to the detecting unit, for starting a timer for detecting radio link failure of the plurality of targets of interest according to the indication signal.

The present invention further discloses a communication device of accurately handling radio link failure detection for a wireless communication system. The communication device includes a plurality of detecting units for performing radio problem detection for a plurality of targets of interest and generating an indication signal when a radio problem is detected on one of the plurality of targets of interest, and a plurality of management units corresponding to the plurality of targets of interest, for managing timers for detecting radio link failure of the plurality of targets of interest, wherein a first management unit corresponding to the target of interest having the radio problem starts a timer according to the indication signal.

The present invention further discloses a communication device of accurately handling radio link failure detection for a wireless communication system. The communication device includes a detecting unit for performing radio problem detection for a plurality of targets of interest, generating a first indication signal when a radio problem of a first target of interest is detected, and generating a second indication signal when radio problems of the rest of the plurality of targets of interest are detected, a first management unit for starting a first timer for detecting radio link failure of the first target of interest according to the first indication signal, and a second management unit for starting a second timer for detecting radio link failure of the rest of the plurality of targets of interest according to the second indication signal.

The present invention further discloses a communication device of accurately handling radio link failure detection for a wireless communication system. The communication device includes a computer readable recording medium for storing program code corresponding to a process, and a processor coupled to the computer readable recording medium, for processing the program code to execute the process. The process includes performing radio problem detection for a plurality of targets of interest, and starting a timer for detecting radio link failure of the plurality of targets of interest when radio problems are detected on the plurality of targets of interest.

The present invention further discloses a communication device of accurately handling radio link failure detection for a wireless communication system. The communication device includes a computer readable recording medium for storing program code corresponding to a process, and a processor coupled to the computer readable recording medium, for processing the program code to execute the process. The process includes performing radio problem detection for a plurality of targets of interest, and starting a timer for detecting radio link failure of one of the plurality of targets of interest when a radio problem is detected on the target of interest.

The present invention further discloses a communication device of accurately handling radio link failure detection for a wireless communication system. The communication device includes a computer readable recording medium for storing program code corresponding to a process, and a processor coupled to the computer readable recording medium, for processing the program code to execute the process. The process includes performing radio problem detection for a plurality of targets of interest, starting a first timer for detecting radio link failure of a first target of interest of the plurality of targets of interest when a radio problem is detected on the first target of interest, and starting a second timer for detecting radio link failure of the rest of the plurality of targets of interest when radio problems are detected on the rest of the plurality of the targets of interest.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
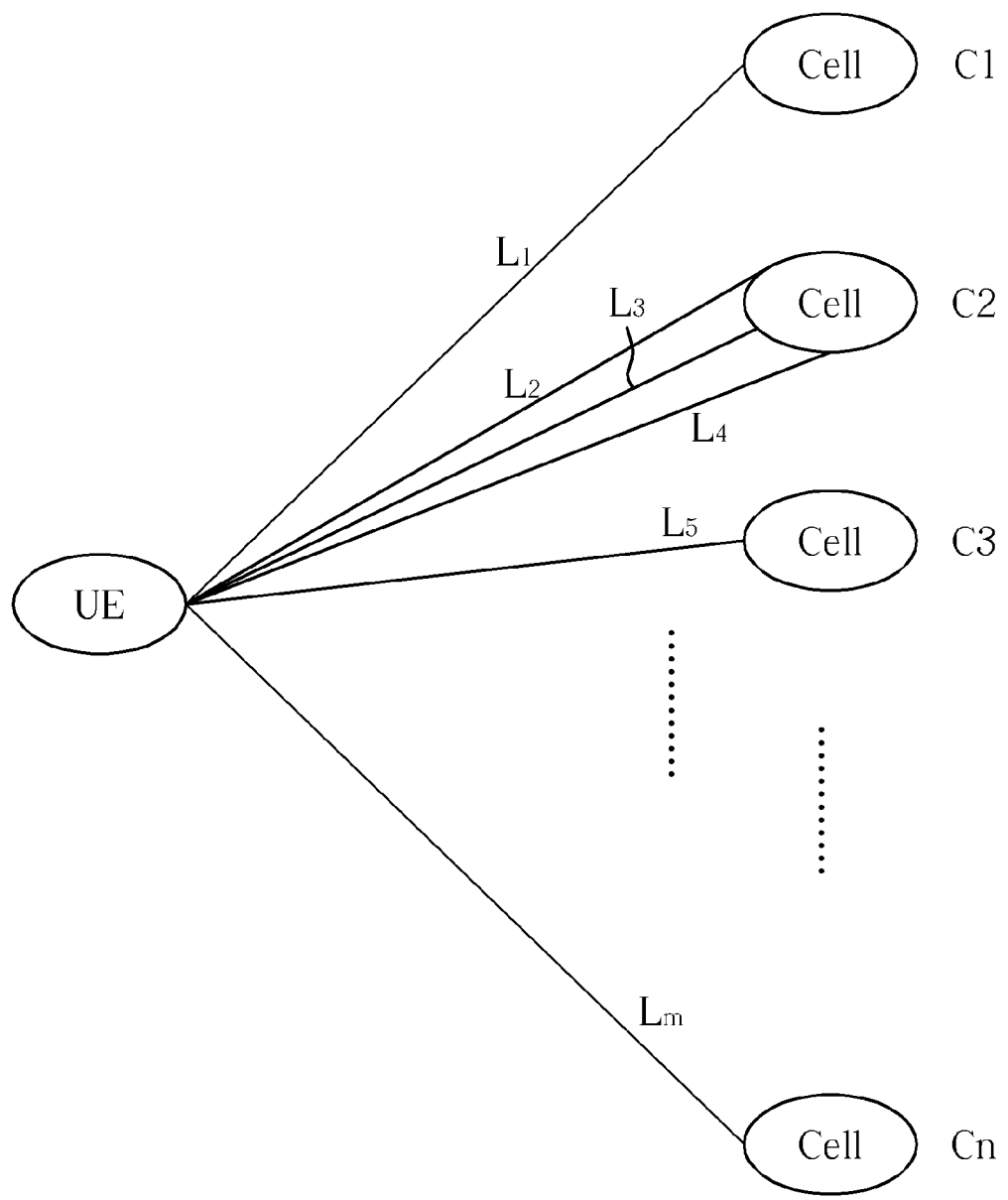
FIG. 1 is a schematic diagram of a wireless communication system with multiple component carriers.

Please refer to FIG. 1, which illustrates a schematic diagram of a wireless communication system featuring multiple connections between a UE and cells C1-Cn in. The UE can operate with carrier aggregation and COMP according to the LTE Advanced system. In FIG. 1, the UE and the cells C1-Cn are communicated through radio links $L_1$-$L_m$ each corresponding to a component carrier configured in the UE, and each supports a LTE radio access technology (RAT) or an E-UTRAN (Evolved Universal Terrestrial Radio Access Network) RAT supporting the function of multiple component carriers on one UE. For example, the UE communicates with the cell C1 through the radio link $L_1$, communicates with the cell C2 through the radio links $L_2$-$L_4$, and so on. The configured component carriers or the cells C1-Cn are defined as targets of interest for the UE because the radio links $L_1$-$L_m$ which the UE connects to are corresponding to the configured component carriers, and to the cells C1-Cn. In other words, the UE considers the cells or the configured components carriers as connecting objects as a result of the radio links $L_1$-$L_m$.

Figure 2:
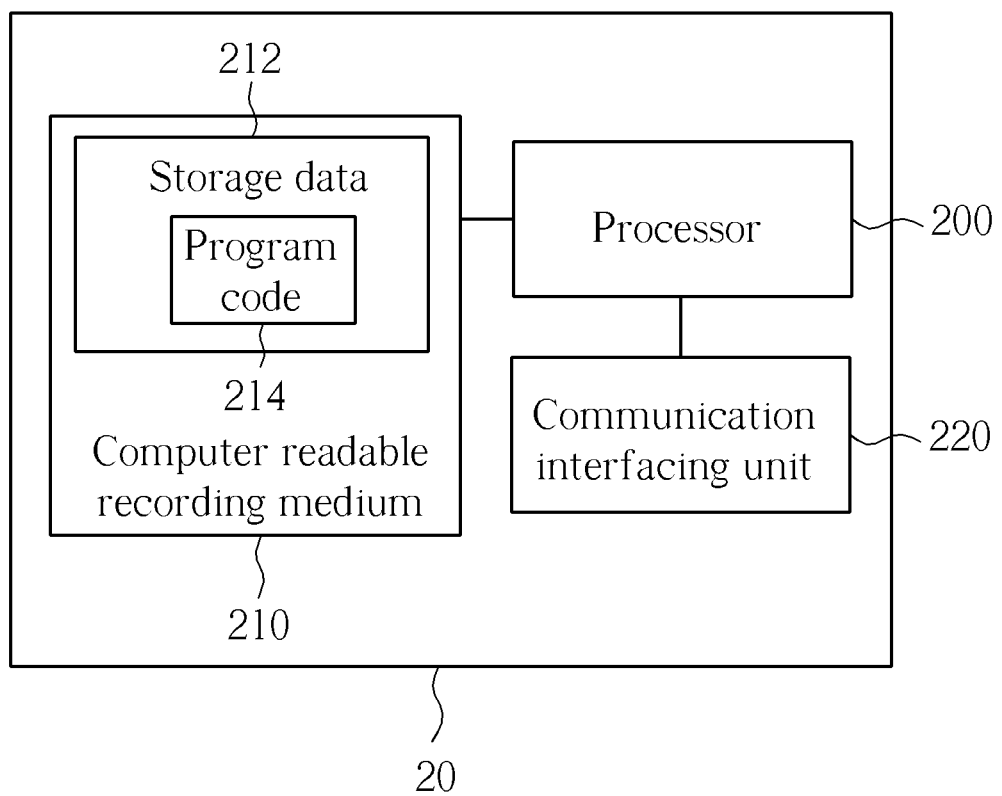
FIG. 2 is a schematic diagram of a communication device according to a first embodiment of the present invention.

Please refer to FIG. 2, which illustrates a schematic diagram of a communication device 20 according to an embodiment of the present invention. The communication device 20 can be the UE shown in FIG. 1 and includes a processor 200, a computer readable recording medium 210 and a communication interfacing unit 220. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The processor 200 controls the communication interfacing unit 220 and related operations and states of the communication device 20 according to processing results of the processor 200. The communication interfacing unit 220 is preferably a radio transceiver for wirelessly communicating with a network.

The program code 214 includes program code of a physical layer which can perform radio problem detection for multiple targets of interest, and problem code of a radio resource control (RRC) layer which can perform radio link failure detection for the multiple targets of interest. Component carriers or cells can be the targets of interest.

A method for handling radio link failure detection for multiple component carriers/cells can be made mainly under the following concerns: reduction of a signaling quantity, maintenance of connection efficiency, and flexibility of radio link failure management.

Figure 3:
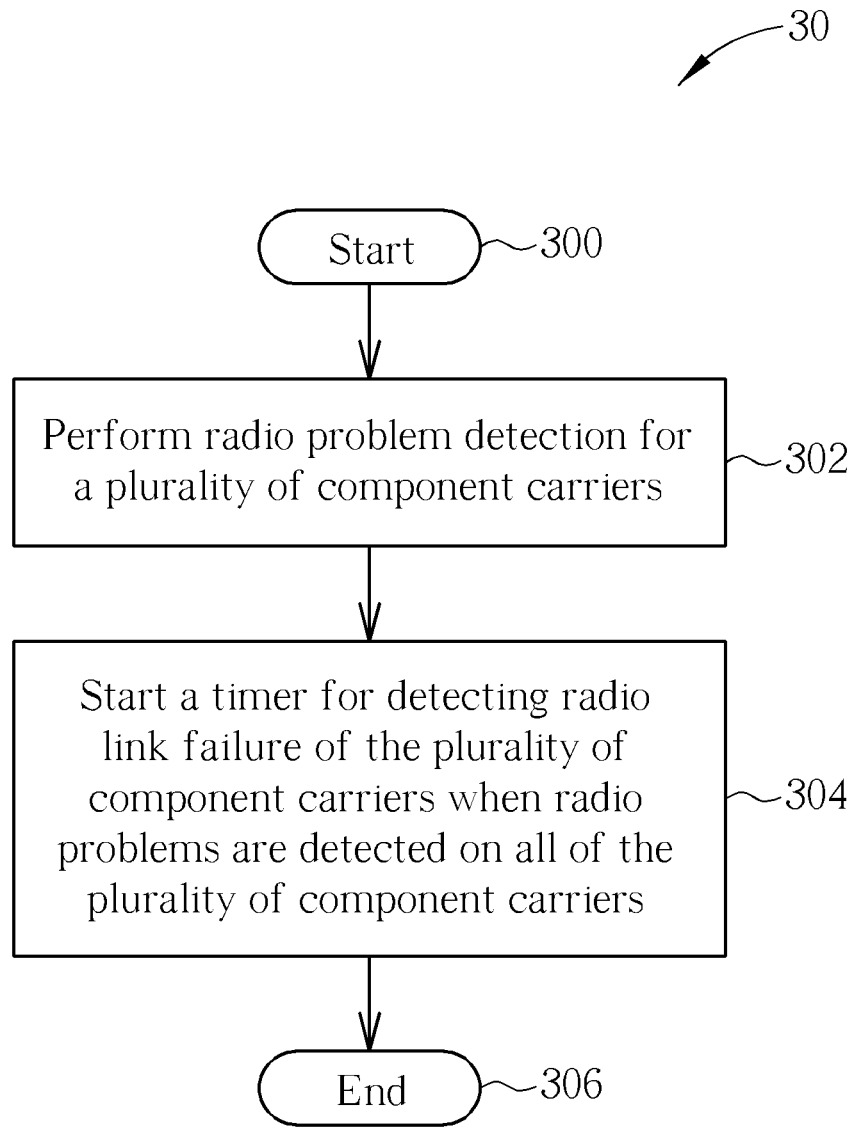
FIG. 3 is a flowchart of a process according to a first embodiment of the present invention.

For signaling quantity reduction, please refer to FIG. 3, which illustrates a flowchart of a process 30 according to a first embodiment of the present invention. The process 30 is utilized in an UE for handling radio link failure detection associated with multiple component carriers in a wireless communication system, and targets of interest are component carriers. The process 30 can be compiled into the program code 214 and includes the following steps:

Step 300: Start.

Step 302: Perform radio problem detection for a plurality of component carriers.

Step 304: Start a timer for detecting radio link failure of the plurality of component carriers when radio problems are detected on all of the plurality of component carriers.

Step 306: End.

According to the process 30, the UE jointly starts the timer for determining whether the radio link failure of the plurality of component carriers occurs when the plurality of component carriers all have the radio problems. That is, the UE does not start the timer until all of the plurality of component carriers have the radio problems.

An example for operation of the radio link detection is described as follows. The UE firstly performs radio problem detection for the plurality of component carriers, and when the radio problems are detected on all of the plurality of component carriers by a physical layer of the UE, the physical layer generates a plurality of consecutive out-of-synchronization indications to a RRC layer of the UE. When the RRC layer receives the plurality of consecutive out-of-synchronization indications, the UE starts the timer for detecting the radio link failure (RLF) of all of the plurality of component carriers.

Starting a timer when all of the plurality of component carriers have the radio problems can reduce a signaling quantity between the physical and RRC layers. Take an example associated to FIG. 1. The UE has radio links $L_1$-$L_m$ corresponding to the plurality of component carriers. The physical layer detects radio problems on the radio links $L_1$-$L_{m-1}$ and does not provide a plurality of out-of-synchronization indications to the RRC layer. When the physical layer further detects a radio problem on the radio link Lm, the physical layer generates the plurality of out-of-synchronization indications to the RRC layer of the UE for timer initiation. As a result, the signaling quantity of the consecutive out-of-synchronization indications can be reduced.

Preferably, the physical layer has to generate a specific number of consecutive out-of-synchronization indications, where the specific number is a number N310.

Please not that, after the UE starts the timer for detecting the RLF of all of the plurality of component carriers, the UE constantly performs radio problem detection for the plurality of component carriers before the timer expires. When the UE synchronizes any one of the plurality of component carriers, the physical layer of the UE considers that the radio problem of the component carriers to be recovered, and generates a plurality of consecutive in-synchronization indications to the RRC layer of the UE. When the RRC layer receives the plurality of consecutive in-synchronization indications, the UE stops the timer to avoid radio link failure.

Preferably, the physical layer has to generate a specific number of consecutive in-synchronization indications, where the specific number is a number N311.

In addition, the UE considers that one of the plurality of component carriers is synchronized, when the UE detects reference signals in any of the component carriers for a predetermined period. For example, before the timer expires, if the UE detects reference signals in the radio link $L_1$, the radio problem of the radio link $L_1$ is considered to be recovered. Preferably, the timer is a timer T310 and may be configured by the network via a RRC message (broadcast or dedicated). For example, in FIG. 1, the UE connects to the cells C1-Cn, where the cell C1 is assumed as a main cell and the cells C2-Cn are supplementary cells. Then, the value of the timer is from system information of the cell C1.

However, if the UE does not synchronize any of the plurality of component carriers, which indicates that none of the radio problems is recovered, the UE determines that the radio link failure of the plurality of component carriers occurs, when the timer expires, and initiates a RRC connection re-establishment procedure for re-establishing at least a radio link of the plurality of component carriers when access stratum (AS) security is activated. Note that, the AS security activation indicates usage of data radio bearers. In addition, if the RRC connection re-establishment procedure is successfully performed, the UE stays in the RRC connected mode and is able to use radio resource from the re-established radio links. On the contrary, if the RRC connection re-establishment procedure is failed to recover the loss of a radio link, the UE goes to a RRC idle mode, and releases the radio resource.

Figure 4:
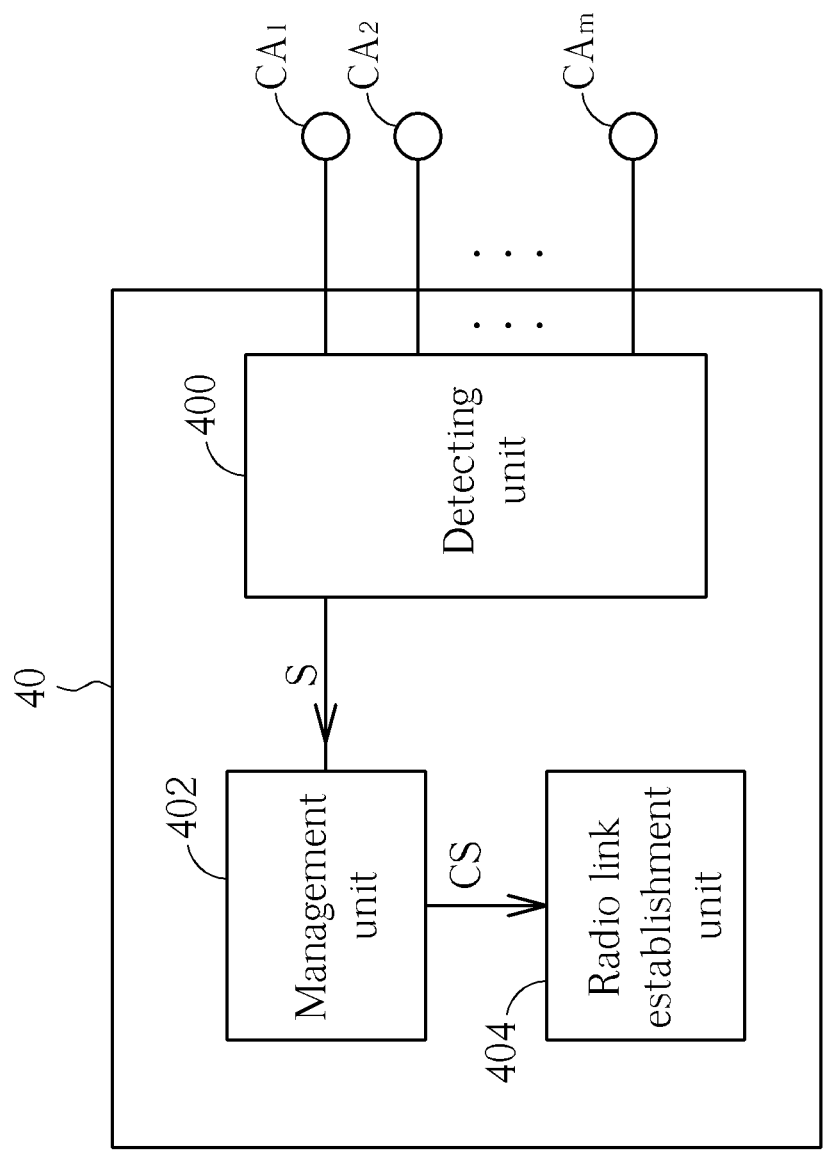
FIG. 4 is a schematic diagram of a communication device according to FIG. 3.

Please refer to FIG. 4 which is a schematic diagram of a communication device 40 according to another embodiment of the present invention. The communication device 40 is used for realizing the process 30 and includes a detecting unit 400, a management unit 402 and a radio link establishment unit 404. The detecting unit 400 is used for performing radio problem detection for component carriers CA1-CAm of the communication device 40, and generating an indication signal S when the radio problems are detected on the component carriers CA1-CAm. The management unit 402 is used for starting a timer for detecting radio link failure of the component carriers CA1-CAm according to the indication signal S.

Preferable, the indication signal S includes a plurality of consecutive out-of-synchronization indications. The detecting unit 400 may further generate a plurality of consecutive in-synchronization indications when one of the radio problems detected on the component carriers CA1-CAm is recovered. Moreover, the management unit 402 may further stop the timer according to the plurality of consecutive in-synchronization indications. Otherwise, the management unit 402 may determine the radio link failure of the component carriers CA1-CAm to be detected when the timer expires, and thereby generating a control signal CS. The radio link establishment unit 404 performs a RRC connection re-establishment procedure according to the control signal CS when AS security is activated. The detailed operations of the communication device 40 can be known by referring the aforementioned description, and therefore not detailed herein.

Figure 5:
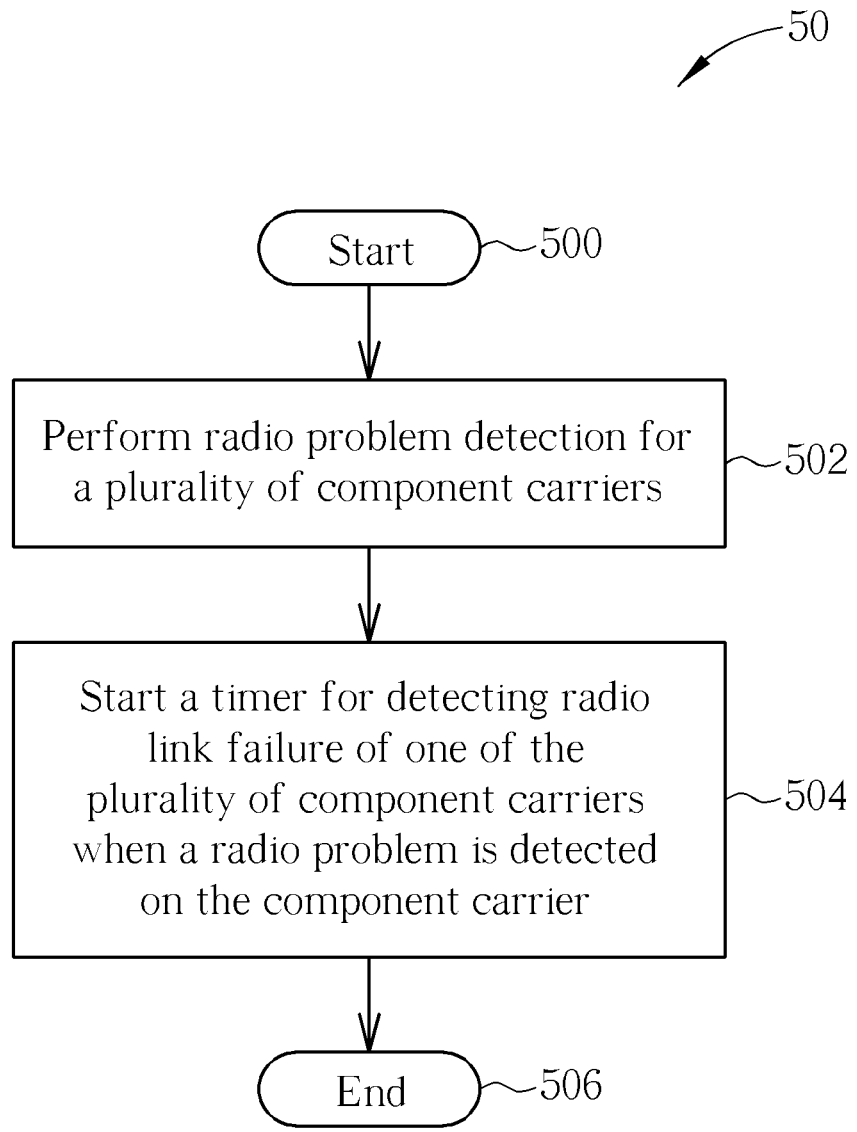
FIG. 5 is a flowchart of a process according to a second embodiment of the present invention.

On the other hand, for connection efficiency maintenance of the UE, please refer to FIG. 5 which is a flowchart of a process 50 according to a second embodiment of the present invention. The process 50 is utilized in the UE for handling radio link failure detection associated with muliple component carriers in a wireless communication system, and targets of interest are component carriers. The process 50 can be compiled into the program code 214 and includes the following steps:

Step 500: Start.

Step 502: Perform radio problem detection for a plurality of component carriers.

Step 504: Start a timer for detecting radio link failure of one of the plurality of component carriers when a radio problem is detected on the component carrier.

Step 506: End.

According to the process 50, the UE independently starts the timer for determining whether the radio link failure of the component carrier occurs, when the component carrier has the radio problem. That is, the UE starts timers for the plurality of component carriers when the plurality of component carriers have radio problems. Take an example based on FIG. 1. The UE starts a timer when component carrier corresponding to the radio link $L_1$ has radio problem, starts another timer when component carrier corresponding to the radio link $L_2$ has radio problem, and so on.

For operation of the radio link detection, the UE firstly detects radio problem for the plurality of component carriers, and when a radio problem is detected on one of the plurality of component carriers, the physical layer of the UE generates a plurality of consecutive out-of-synchronization indications to the RRC layer of the UE. When the RRC layer of the UE receives the plurality of consecutive out-of-synchronization indications, the UE starts a timer for detecting the radio link failure of the component carrier.

Note that, unlike the operation of the process 30, the physical layer of the UE generates the plurality of consecutive out-of-synchronization indications to the RRC layer of the UE when one of the component carriers has the radio problem. Take an example associated to FIG. 1. The UE has radio links $L_1$-$L_m$ corresponding to the plurality of component carriers. The physical layer detects a radio problem on the radio link $L_1$, and provides a plurality of out-of-synchronization indications to the RRC layer of the UE for timer initiation.

Preferably, the physical layer generates a specific number of consecutive out-of-synchronization indications, where the specific number is a number N310.

Moreover, after the UE starts the timer for detecting the RLF of the component carrier, the UE constantly performs radio problem detection for the plurality of component carriers before the timer expires. When the UE synchronizes the component carrier, the physical layer of the UE considers that the radio problem of the component carrier to be recovered, and then generates a plurality of consecutive in-synchronization indications to the RRC layer of the UE. When the RRC layer receives the plurality of consecutive in-synchronization indications, the UE stops the timer to avoid radio link failure.

Preferably, the physical layer generates a specific number of consecutive in-synchronization indications, where the specific number is a number N311. Likewise, the timer is the timer T310, and the description of the timer can be referred from above, so the detail description is omitted herein.

However, if the UE does not synchronize the component carrier, which indicates the radio problem is not recovered, the UE determines that the radio link failure of the component carrier occurs, when the timer expires, and may send a RRC message indicating the occurrence of the radio link failure of the component carrier to the network. If the UE synchronize the component carrier, the UE may initiate a random access procedure for re-establishing a radio link of the component carrier. If the random access procedure is successfully performed, the UE is able to use radio resource of the radio link. If the random access procedure is failed to recover the loss of the radio link, the UE still stays in the RRC connected mode, but is not able to use radio resource from the loss radio link. When the radio link failure occurs on all component carriers, the UE initiates a RRC connection re-establishment procedure for re-establishing at least a radio link of the component carrier when AS security is activated. If the RRC connection re-establishment procedure is successfully performed, the UE stays in the RRC connected mode and is able to use radio resource from the re-established radio links. On the contrary, if the RRC connection re-establishment procedure is failed to recover the loss of a radio link, the UE goes to a RRC idle mode, and releases the radio resource. In addition, the UE does not enter RRC idle mode unless the radio links of all of the plurality of the component carriers are failed, so as to maintain connection efficiency.

Alternatively, the UE initiates a RRC connection re-establishment procedure for re-establishing a radio link of the component carrier instead of only the random access procedure. If the RRC connection re-establishment procedure is failed to recover the loss of the radio link, the UE still stays in the RRC connected mode, but is not able to use radio resource from the loss radio link.

Figure 6:
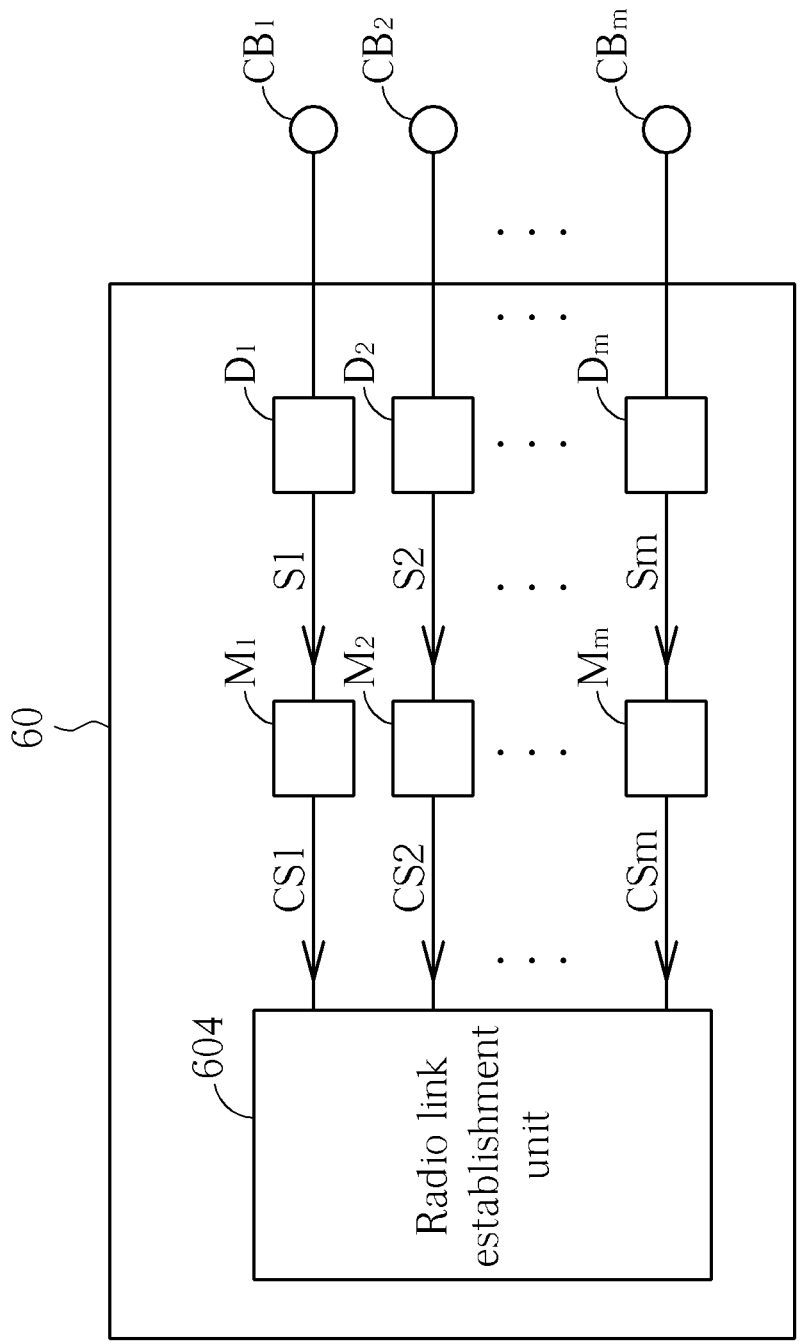
FIG. 6 is a schematic diagram of a communication device according to FIG. 5.

Please refer to FIG. 6 which is a schematic diagram of a communication device 60 according to another embodiment of the present invention. The communication device 60 is used for realizing the process 50, which includes detecting units D1-Dm, management units M1-Mm and a radio link establishment unit 604. The detecting units D1-Dm correspond to the management units M1-Mm, and are used for performing radio problem detection for component carriers CB1-CBm of the communication device 60 respectively. In addition, any of the detecting units D1-Dm generate indication signals S1-Sm when radio problems are detected on the component carriers CB1-CBm, respectively. The management units M1-Mm correspond to the component carriers CB1-CBm, and are used for managing timers for detecting radio link failure of the component carriers CB1-CBm, wherein any one of the management units M1-Mm corresponding to the component carriers CB1-CBm having the radio problem start timers according to indication signals S1-Sm, respectively. Preferably, the indication signals S1-Sm each can include a plurality of consecutive out-of-synchronization indications.

Take an example for clearly illustrating operations between the detecting units D1-Dm, the management units M1-Mm and the radio link establishment unit 604 of the communication device 60. Assume the detecting unit D1 detects a radio problem on the component carrier CB1. The detecting unit D1 then generates the indication signal S1 to the management unit M1. According to the indication signal S1, the management unit M1 starts a timer for detecting radio link failure of the component carrier CBA1. The detecting unit D1 may further generate a plurality of consecutive in-synchronization indications when the radio problem detected on the component carrier CB1 is recovered. Moreover, the management unit M1 may further stop the timer according to the plurality of consecutive in-synchronization indications. Otherwise, the management unit M1 may determine the radio link failure of the component carrier CB1 to be detected when the timer expires, and generate a control signal CS1 to the radio link establishment unit 604. According to the control signal CS1, the radio link establishment unit 604 performs a RRC connection re-establishment procedure or a random access procedure for re-establishing a radio link of the component carrier CB1 when AS security is activated. Likewise, functions of the detecting units D2-Dm and the management units M2-Mm are similar to functions of the detecting unit D1 and the management unit M1.

The detailed operations of the communication device 60 can be known by referring the aforementioned description, and therefore not detailed herein.

Figure 7:
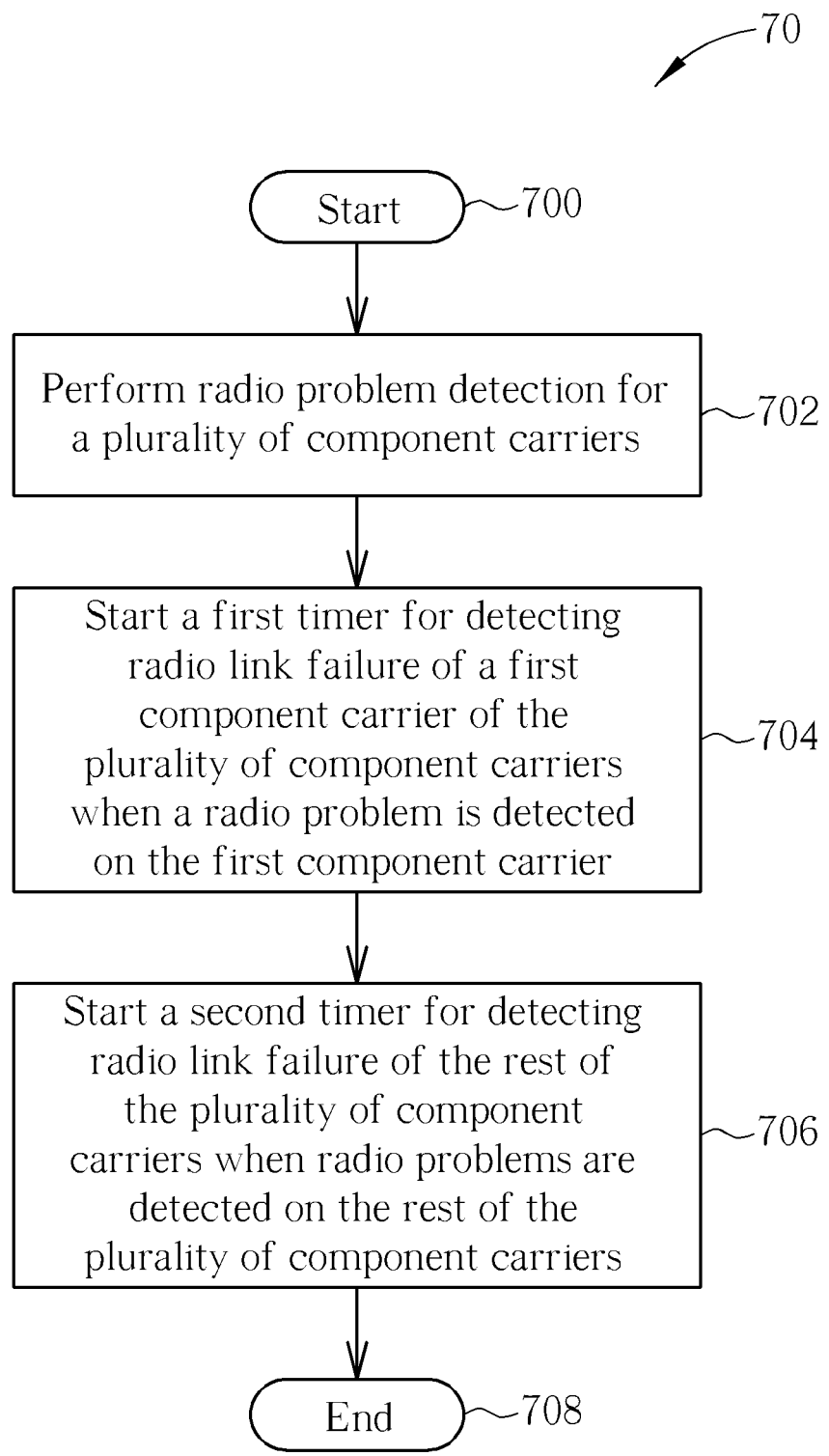
FIG. 7 is a flowchart of a process according to a third embodiment of the present invention.

On the other hand, for increasing flexibility of radio link failure management, please refer to FIG. 7 which is a flowchart of a process 70 according to a third embodiment of the present invention. The process 70 is utilized in the UE for handling the radio link failure detection associated with muliple component carriers in a wireless communication system, and targets of interest are component carriers. The process 70 can be compiled into the program code 214 and includes the following steps:

Step 700: Start.

Step 702: Perform radio problem detection for a plurality of component carriers.

Step 704: Start a first timer for detecting radio link failure of a first component carrier of the plurality of component carriers when a radio problem is detected on the first component carrier.

Step 706: Start a second timer for detecting radio link failure of the rest of the plurality of component carriers when radio problems are detected on the rest of the plurality of component carriers.

Step 708: End.

According to the process 70, the first timer and the second timer are separately started for detecting the radio link failure of the first component carrier and the rest of the component carriers when the first component carrier has the radio problem and the rest of the plurality of component carriers have the radio problems. That is, when the radio problem is detected on the first component carrier, the UE starts the first timer for determining whether the radio link failure of the first component carrier occurs, and starts the second timer for determining whether the radio link failure of the rest of component carriers occurs when the radio problems are detected on the rest of the component carriers.

For operation of the radio link detection, the UE firstly performs radio problem detection for the plurality of component carriers. When the radio problem is detected on the first component carrier by the physical layer of the UE, the physical layer generates a first number of consecutive out-of-synchronization indications to the RRC layer of the UE. Similarly, when the radio problems are detected on the rest of the component carriers, the physical layer generates a second number of consecutive out-of-synchronization indications to the RRC layer. The first and second numbers can be configured by the RRC layer. When the RRC layer receives the first number of consecutive out-of-synchronization indications, the UE starts the first timer for detecting the RLF of the first component carrier, and when the RRC layer receives the second number of consecutive out-of-synchronization indications, the UE starts the second timer for detecting the RLF of the rest of the plurality of the component carriers.

Preferably, the first component carrier is a main component carrier or a main cell, and the rest of the plurality of component carriers are supplement component carriers or supplement cells.

Please note that, after the UE starts the first timer for detecting the RLF of the first component carrier, the UE constantly performs radio problem detection for the plurality of component carriers before the first timer expires. When the UE synchronizes the first component carrier, the physical layer of the UE considers that the radio problem of the first component carrier is recovered, and generates a third number of consecutive in-synchronization indications to the RRC layer of the UE. When the RRC layer of the UE receives the third number of consecutive in-synchronization indications, the UE stops the first timer to avoid the radio link failure of the first component carrier. Similarly, before the second timer expires, if the UE synchronizes to the rest of the plurality of component carriers, the UE considers that the radio problems of the rest of the plurality of component carriers is recovered, and the physical layer of the UE generates a fourth number of consecutive in-synchronization indications to the RRC layer. The UE stops the second timer to avoid the radio link failure of the rest of the plurality of component carriers when the fourth number of consecutive in-synchronization indications are received. The third and fourth numbers can be configured by the RRC layer.

However, if the radio problem of the first component carrier is not recovered, the UE determines that the radio link failure of the first component carrier occurs, when the first timer expires, and initiates a RRC connection re-establishment procedure or a random access procedure for re-establishing a radio link of the first component carrier when AS security is activated. If the RRC connection re-establishment procedure or random access procedure is successfully performed, the UE stays in the RRC connected mode and is able to use radio resource from the re-established radio link. On the other hand, if the RRC connection re-establishment procedure or random access procedure is failed to recover the radio link of the first component carrier, the UE still stays in the RRC connected mode but is not able to use radio resource from the first component carrier. In addition, the UE does not go to the RRC idle mode unless the radio links of the rest of the plurality of component carriers are all failed, so as to maintain connection efficiency.

Similarly, if the radio problems of the rest of the plurality of component carriers are not recovered, the UE determines that the radio link failure of the rest of the component carriers occurs, when the second timer expires, and initiates a RRC connection re-establishment procedure or random access procedure for re-establishing at least a radio link of the rest of component carriers when AS security is activated. If the RRC connection re-establishment procedure or random access procedure is successfully performed, the UE stays in the RRC connected mode and is able to use radio resource from the re-established radio links of the rest of the component carriers. On the other hand, if the RRC connection re-establishment procedure or random access procedure is failed to recover the loss of the radio links of the rest of the component carriers, the UE still stays in the RRC connected mode but is not able to use radio resource from the rest of the component carriers. In addition, the UE goes to the RRC idle mode when the radio link of the first component carrier is failed. If the radio link failure of the first and the rest of the component carriers occurs, the UE initiates a RRC connection re-establishment procedure for re-establishing at least a radio link of the component carrier when AS security is activated. If the RRC connection re-establishment procedure is successfully performed, the UE stays in the RRC connected mode and is able to use radio resource from the re-established radio links. On the contrary, if the RRC connection re-establishment procedure is failed to recover the loss of a radio link, the UE goes to a RRC idle mode, and releases the radio resource.

Figure 8:
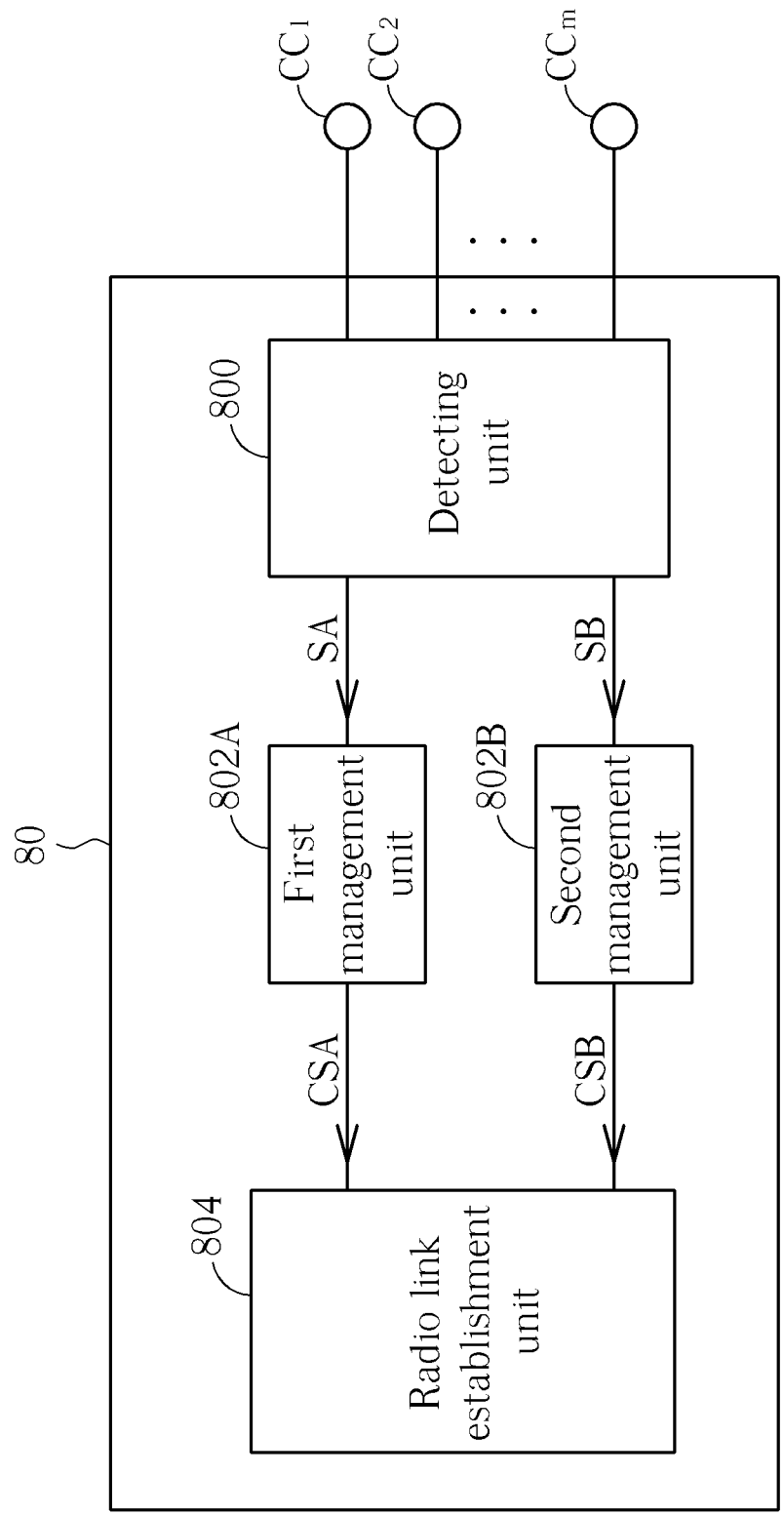
FIG. 8 is a schematic diagram of a communication device according to FIG. 7.

Please refer to FIG. 8, which is a schematic diagram of a communication device 70 according to another embodiment of the present invention. The communication device 80 is used for realizing the process 70, which includes a detecting unit 800, a first management unit 802A, a second management unit 802B and a radio link establishment unit 804. The detecting unit 800 is used for performing radio problem detection for component carriers CC1-CCm, generating a first indication signal SA when a radio problem of the first component carrier CC1 is detected, and generating a second indication signal SB when radio problems of the rest of the component carriers CC2-CCm are detected. The first management unit 802A is used for starting a first timer for detecting radio link failure of the first component carrier CC1 according to the first indication signal SA. The second management unit 802B is used for starting a second timer for detecting radio link failure of the rest of the component carriers CC2-CCm according to the second indication signal SB.

Preferably, the first indication signal SA includes a first number of consecutive out-of-synchronization indications, and the second indication signal SB includes a second number of consecutive out-of-synchronization indications. The detecting unit 800 may further generate a third number of consecutive in-synchronization indications when the radio problem detected on the first component carrier CC1 is recovered, and generating a fourth number of consecutive in-synchronization indications when one of the radio problems detected on the rest of the component carriers CC2-CCm is recovered. The first to fourth numbers all can be configured by the RRC layer. Moreover, the first management unit 802A may further stop the first timer according to the third number of consecutive in-synchronization indications. Otherwise, the first management unit 802A may determine the radio link failure of the first component carrier CC1 to be detected, when the first timer expires, and generating a first control signal CSA. Similarly, the second management unit 802B may further stop the second timer according to the fourth number of consecutive in-synchronization indications. Otherwise, the second management unit 802B may determine the radio link failure of the rest of the component carriers CC2-CCm to be detected when the second timer expires, and generating a second control signal CSB. The radio link establishment unit 804 performs a RRC connection re-establishment procedure or a random access procedure according to the first control signal CSA/the second control signal CSB when AS security is activated. The detailed operations of the communication device 80 can be known by referring the aforementioned description, and therefore not detailed herein.

Please note that, in addition to component carriers, the examples of FIGS. 3-8 are also applied for cells used as targets of interest.

In conclusion, the embodiments of the present invention provide different ways of managing radio link failure detecting timer for multiple targets of interest (e.g. component carriers or cells) for reducing the signaling quantity, maintaining connection efficiency, and increasing flexibility of radio link failure detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling radio link failure detection for a communication device of a wireless communication system, the method comprising:
    connecting to a plurality of cells with the same component carrier or with a plurality of component carriers;
    performing radio problem detection for the plurality of component carriers or cells comprising generating a plurality of consecutive out-of-synchronization indications when the radio problems are detected on the plurality of component carriers or cells; and
    starting a timer for detecting radio link failure of the plurality of component carriers or cells when radio problems are detected on all of the plurality of component carriers or cells.

2. The method of claim 1, wherein starting the timer for detecting the radio link failure of the plurality of component carriers or cells when radio problems are detected on the plurality of component carriers or cells comprises starting the timer for detecting the radio link failure of the plurality of component carriers or cells according to the plurality of consecutive out-of-synchronization indications.

3. The method of claim 1 further comprising determining the radio link failure of the plurality of component carriers or cells to be detected when the timer expires.

4. The method of claim 3 further comprising performing a radio resource control (RRC) connection re-establishment procedure for re-establishing at least a radio link of the plurality of component carriers or cells.

5. The method of claim 1 further comprising:
    generating a plurality of consecutive in-synchronization indications when one of the radio problems is recovered; and
    stopping the timer according to the plurality of consecutive in-synchronization indications.

6. A method of handling radio link failure detection for a communication device of a wireless communication system, the method comprising:
    connecting to a plurality of cells with the same component carrier or with a plurality of component carriers;
    performing radio problem detection for the plurality of component carriers or cells comprising generating a plurality of consecutive out-of-synchronization indications when the radio problem is detected on the component carriers or cells; and
    starting a timer for detecting radio link failure of one of the plurality of component carriers or cells when a radio problem is detected on the component carriers or cells.

7. The method of claim 6, wherein starting the timer for detecting the radio link failure of the component carriers or cells when the radio problem is detected on the component carriers or cells comprises starting the timer for detecting the radio link failure of the component carriers or cells according to the plurality of consecutive out-of-synchronization indications.

8. The method of claim 6 further comprising determining the radio link failure of the component carriers or cells to be detected when the timer expires.

9. The method of claim 8 further comprising performing a radio resource control (RRC) connection re-establishment procedure or a random access procedure for re-establishing a radio link of the component carriers or cells.

10. The method of claim 6 further comprising:
    generating a plurality of consecutive in-synchronization indications when the radio problem is recovered; and
    stopping the timer according to the plurality of consecutive in-synchronization indications.

11. A method of handling radio link failure detection for a communication device of a wireless communication system, the method comprising:
    connecting to a plurality of cells with the same component carrier or with a plurality of component carriers;
    performing radio problem detection for the plurality of component carriers or cells comprising generating a first number of consecutive out-of-synchronization indications when the radio problem is detected on the first component carrier or cell;

starting a first timer for detecting radio link failure of a first component carrier or cell of the plurality of component carriers or cells when a radio problem is detected on the first component carrier or cell; and starting a second timer for detecting radio link failure of the rest of the plurality of component carriers or cells when radio problems are detected on the rest of the plurality of component carriers or cells.

12. The method of claim 11, wherein performing the radio problem detection for the plurality of component carriers or cells further comprises:

generating a second number of consecutive out-of-synchronization indications when the radio problems are detected on the rest of the plurality of component carriers or cells.

13. The method of claim 12, wherein starting the first timer for detecting the radio link failure of the first component carrier or cell of the plurality of component carriers or cells when the radio problem is detected on the first component carrier or cell comprises starting the first timer according to the first number of consecutive out of synchronization indications; and starting the second timer for detecting radio link failure of the rest of the plurality of component carriers or cells when radio problems are detected on the rest of the plurality of component carriers or cells comprises starting the second timer according to the second number of consecutive out of synchronization indications.

14. The method of claim 11 further comprising:

determining the radio link failure of the first component carrier or cell to be detected when the first timer expires; and determining the radio link failure of the rest of the plurality of component carriers or cells to be detected when the second timer expires.

15. The method of claim 14 further comprising performing a radio resource control (RRC) connection re-establishment procedure or a random access procedure for re-establishing a radio link of the first component carrier or cell or for re-establishing at least a radio link of the rest of the component carriers or cells.

16. The method of claim 12 further comprising:

generating a third number of consecutive in-synchronization indications when the radio problem of the first component carrier or cell is recovered before the first timer expires;

generating a fourth number of consecutive in-synchronization indications when one of the radio problems of the rest of the component carriers or cells is recovered before the second timer expires;

stopping the first timer according to the first number of consecutive in-synchronization indications; and stopping the second timer according to the second number of consecutive in-synchronization indications.

17. A communication device of accurately handling radio link failure detection for a wireless communication system, the communication device comprising:

a connecting unit for connecting to a plurality of cells with the same component carrier or with a plurality of component carriers;

a detecting unit for performing radio problem detection for the plurality of component carriers or cells and generating an indication signal comprising a plurality of consecutive out-of-synchronization indications when radio problems are detected on the plurality of component carriers or cells; and a management unit, coupled to the detecting unit, for starting a timer for detecting radio link failure of the plurality of component carriers or cells according to the indication signal.

18. The communication device of claim 17, wherein the management unit determines the radio link failure of the plurality of component carriers or cells to be detected when the timer expires, and generates a control signal.

19. The communication device of claim 18 further comprising a radio link establishment unit for performing a radio resource control (RRC) connection re-establishment procedure for re-establishing at least a radio link of the plurality of component carriers or cells according to the control signal.

20. The communication device of claim 17, wherein the detecting unit further generates a plurality of consecutive in-synchronization indications when one of the radio problems detected on the plurality of component carriers or cells is recovered.

21. The communication device of claim 20, wherein the management unit stops the timer according to the plurality of consecutive in-synchronization indications.

22. A communication device of accurately handling radio link failure detection for a wireless communication system, the communication device comprising:

a connecting unit for connecting to a plurality of cells with the same component carrier or with a plurality of component carriers;

a plurality detecting unit for performing radio problem detection for the plurality of component carriers or cells and generating an indication comprising a plurality of consecutive out-of-synchronization indications signal when a radio problem is detected on one of the plurality of component carriers or cells; and a plurality of management units corresponding to the plurality of component carriers or cells, for managing timers for detecting radio link failure of the plurality of component carriers or cells;

wherein a first management unit corresponding to the component carrier or cell having the radio problem starts a timer according to the indication signal.

23. The communication device of claim 22, wherein the first management unit determines the radio link failure of the component carrier or cell to be detected when the timer expires, and generates a control signal.

24. The communication device of claim 23 further comprising a radio link establishment unit for performing a radio resource control (RRC) connection re-establishment procedure or a random access procedure for re-establishing a radio link of the component carrier or cell according to the control signal.

25. The communication device of claim 22, wherein the detecting unit further generates a plurality of consecutive in-synchronization indications when the radio problem detected on the component carrier or cell is.

26. The communication device of claim 25, wherein the first management unit stops the timer according to the plurality of consecutive in-synchronization indications.

27. A communication device of accurately handling radio link failure detection for a wireless communication system, the communication device comprising:

a connecting unit for connecting to a plurality of cells with the same component carrier or with a plurality of component carriers;

a detecting unit for performing radio problem detection for the plurality of component carriers or cells, generating a first indication signal when a radio problem of the first component carrier or cell is detected, and generating a second indication signal when radio problems of the rest of the plurality of component carriers or cells are detected, wherein the first indication signal comprises a first number of consecutive out-of-synchronization indications;
a first management unit for starting a first timer for detecting radio link failure of the first component carrier or cell according to the first indication signal; and
a second management unit for starting a second timer for detecting radio link failure of the rest of the plurality of component carriers or cells according to the second indication signal.

28. The communication device of claim 27, wherein the second indication signal comprises a second number of consecutive out-of-synchronization indications.

29. The communication device of claim 27, wherein the first management unit determines the radio link failure of the first component carrier or cell to be detected when the first timer expires, and generates a first control signal, and the second management unit determines the radio link failure of the rest of the plurality component carriers or cells to be detected when the second timer expires, and generates a second control signal.

30. The communication device of claim 29 further comprising a radio link establishment unit for performing a radio resource control (RRC) connection re-establishment procedure or a random access procedure for re-establishing a radio link of the first component carrier or cell according to the first control signal, or for re-establishing at least a radio link of the rest of the component carriers or cells according to the second control signal when access stratum (AS) security is activated.

31. The communication device of claim 28, wherein the detecting unit further generates a third number of consecutive in-synchronization indications when the radio problem detected on the first component carrier or cell is recovered before the first timer expires, and generates a fourth number of consecutive in-synchronization indications when one of the radio problems detected on the rest of the plurality of component carriers or cells is recovered before the second timer expires.

32. The communication device of claim 31, wherein the first management unit stops the first timer according to the third number of consecutive in-synchronization indications, and the second management unit stops the second timer according to the fourth number of consecutive in-synchronization indications.

33. A communication device of accurately handling radio link failure detection for a wireless communication system, the communication device comprising:
a computer readable recording medium for storing program code corresponding to a process; and
a processor coupled to the computer readable recording medium, for processing the program code to execute the process;
wherein the process comprises:
connecting to a plurality of cells with the same component carrier or with a plurality of component carriers;
performing radio problem detection for the plurality of component carriers or cells comprising generating a plurality of consecutive out-of-synchronization indications when the radio problems are detected on the plurality of component carriers or cells; and
starting a timer for detecting radio link failure of the plurality of component carriers or cells when radio problems are detected on the plurality of component carriers or cells.

34. The communication device of claim 33, wherein starting the timer for detecting the radio link failure of the plurality of component carriers or cells when the radio problems are detected on the plurality of component carriers or cells comprises starting the timer according to the plurality of consecutive out-of-synchronization indications.

35. The communication device of claim 33, wherein the process further comprises determining the radio link failure of the plurality of component carriers or cells to be detected when the timer expires.

36. The communication device of claim 35, wherein the process further comprises performing a radio resource control (RRC) connection re-establishment procedure for re-establishing at least a radio link of the plurality of component carriers or cells.

37. The communication device of claim 33 further comprising:
generating a plurality of consecutive in-synchronization indications when one of the radio problems is recovered; and
stopping the timer according to the plurality of consecutive in-synchronization indications.

38. A communication device of accurately handling radio link failure detection for a wireless communication system, the communication device comprising:
a computer readable recording medium for storing program code corresponding to a process; and
a processor coupled to the computer readable recording medium, for processing the program code to execute the process;
wherein the process comprises:
connecting to a plurality of cells with the same component carrier or with a plurality of component carriers;
performing radio problem detection for the plurality of component carriers or cells comprising generating a plurality of consecutive out-of-synchronization indications when the radio problem is detected on the component carrier or cell; and
starting a timer for detecting radio link failure of one of the plurality of component carriers or cells when a radio problem is detected on the component carriers or cells.

39. The communication device of claim 38, wherein starting the timer for detecting the radio link failure of the component carrier or cell when the radio problem is detected on the component carrier or cell comprises starting the timer according to the plurality of consecutive out-of-synchronization indications.

40. The communication device of claim 38, wherein the process further comprises determining the radio link failure of the component carrier or cell to be detected when the timer expires.

41. The communication device of claim 40, wherein the process further comprises performing a radio resource control (RRC) connection re-establishment procedure or a random access procedure for re-establishing a radio link of the component carrier or cell.

42. The communication device of claim 38 further comprising:
generating a plurality of consecutive in-synchronization indications when the radio problem is recovered; and
stopping the timer according to the plurality of consecutive in-synchronization indications.

43. A communication device of accurately handling radio link failure detection for a wireless communication system, the communication device comprising:
a computer readable recording medium for storing program code corresponding to a process; and a processor coupled to the computer readable recording medium, for processing the program code to execute the process;

wherein the process comprises:

connecting to a plurality of cells with the same component carrier or with a plurality of component carriers;

performing radio problem detection for the plurality of component carriers or cells comprising generating a first number of consecutive out-of-synchronization indications when the radio problem is detected on the first component carrier or cell;

starting a first timer for detecting radio link failure of a first component carrier or cell of the plurality of component carriers or cells when a radio problem is detected on the first component carrier or cell; and starting a second timer for detecting radio link failure of the rest of the plurality of component carriers or cells when radio problems are detected on the rest of the plurality of the component carriers or cells.

44. The communication device of claim 43, wherein performing the radio problem detection for the plurality of component carriers or cells further comprises generating a second number of consecutive out-of-synchronization indications when the radio problems are detected on the rest of the plurality of component carriers or cells.

45. The communication device of claim 44, wherein starting the first timer for detecting the radio link failure of the first component carrier or cell of the plurality of component carriers or cells when the radio problem is detected on the first component carrier or cell comprises starting the first timer according to the first number of consecutive out-of-synchronization indications; and starting the second timer for detecting the radio link failure of the rest of the plurality of component carriers or cells when the radio problems are detected on the rest of the plurality of component carriers or cells comprises starting the second timer according to the second number of consecutive out of synchronization indications.

46. The communication device of claim 43, wherein the process further comprises determining the radio link failure of the first component carrier or cell to be detected when the first timers expires, and determining the radio link failure of the rest of the plurality of component carriers or cells to be detected when the second timers expires.

47. The communication device of claim 46, wherein the process further comprises performing a radio resource control (RRC) connection re-establishment procedure or a random access procedure for re-establishing a radio link of the first component carrier or cell or for re-establishing at least a radio link of the rest of the component carriers or cells.

48. The communication device of claim 44 further comprising:

generating a third number of consecutive in-synchronization indications when the radio problem is recovered before the first timer expires;

generating a fourth number of consecutive in-synchronization indications when one of the radio problems is recovered before the second timer expires;

stopping the first timer according to the third number of consecutive in-synchronization indications; and stopping the second timer according to the fourth number of consecutive in-synchronization indications.

* * * * *